(12) United States Patent
Ishii et al.

(10) Patent No.: US 10,899,302 B2
(45) Date of Patent: Jan. 26, 2021

(54) AIRBAG DEVICE

(71) Applicant: TOYODA GOSEI CO., LTD., Kiyosu (JP)

(72) Inventors: Tsutomu Ishii, Kiyosu (JP); Tadashi Yamada, Kiyosu (JP); Yuji Sato, Kiyosu (JP); Koji Kawamura, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 28 days.

(21) Appl. No.: 16/353,053

(22) Filed: Mar. 14, 2019

(65) Prior Publication Data

US 2019/0299906 A1 Oct. 3, 2019

(30) Foreign Application Priority Data

Mar. 29, 2018 (JP) ................. 2018-064852

(51) Int. Cl.
  *B60R 21/203* (2006.01)
  *B60R 21/217* (2011.01)
(52) U.S. Cl.
  CPC ........ *B60R 21/2037* (2013.01); *B60R 21/217* (2013.01); *B60R 2021/2172* (2013.01)
(58) Field of Classification Search
  CPC ............ B60R 21/2165; B60R 21/2037; B60R 21/215; B60R 21/21656; B60Q 5/003
  USPC ....................................... 280/731
  See application file for complete search history.

(56) References Cited

U.S. PATENT DOCUMENTS

| | | | |
|---|---|---|---|
| 5,509,685 A * | 4/1996 | Boyle, III | B60R 21/217 280/728.2 |
| 5,577,766 A * | 11/1996 | Niwa | B60Q 1/0082 200/61.54 |
| 5,636,858 A * | 6/1997 | Niederman | B60R 21/2035 280/728.2 |
| 6,565,113 B2 * | 5/2003 | Kassman | B60R 21/217 280/728.2 |
| 7,878,533 B2 * | 2/2011 | Shimazaki | B60R 21/203 280/731 |
| 10,351,089 B2 * | 7/2019 | Ishii | B60R 21/2037 |
| 2002/0074781 A1 * | 6/2002 | Schutz | B60R 21/2037 280/731 |

(Continued)

FOREIGN PATENT DOCUMENTS

JP    2016-084005 A    5/2016

*Primary Examiner* — Toan C To
(74) *Attorney, Agent, or Firm* — Posz Law Group, PLC

(57) ABSTRACT

An airbag device for a steering wheel includes: an inflator for supplying an inflation gas to a folded airbag, the inflator including: a main body having a gas discharge portion on an upper portion side; and a flange portion provided on an outer peripheral surface of the main body which is the outer peripheral surface located further on a lower side than the gas discharge port; an attachment base holding the inflator by making the flange portion be attached to the attachment base; fastening members arranged at a plurality positions in a lower surface side around the inflator and mounted on the steering wheel main body by the fastening members. Each of the fastening members is disposed such that at least a part of the fastening member is disposed so as to vertically overlap the flange portion in a lower side of the flange portion.

1 Claim, 13 Drawing Sheets

(56) References Cited

U.S. PATENT DOCUMENTS

| | | | |
|---|---|---|---|
| 2006/0175816 A1* | 8/2006 | Spencer | B60R 21/2037 280/731 |
| 2010/0219621 A1* | 9/2010 | Sasaki | B60Q 5/003 280/731 |
| 2016/0114752 A1 | 4/2016 | Banno | |
| 2017/0136978 A1 | 5/2017 | Banno | |

* cited by examiner

AIRBAG DEVICE

CROSS-REFERENCE TO RELATED APPLICATION(S)

This application is based upon and claims the benefit of priority from Japanese Patent Application No. 2018-064852, filed on Mar. 29, 2018, the entire contents of which are incorporated herein by reference.

BACKGROUND

1. Field of the Invention

The present invention relates to an airbag device attached to a steering wheel main body of a vehicle.

2. Description of the Related Art

In a related art, this type of airbag device is constituted by including an airbag which inflates by an inflation gas, an inflator which supplies the inflation gas to a folded airbag, and an attachment base for holding the inflator (see JP-A-2016-084005, for example). The inflator is constituted by having a main body having a gas discharge port on an upper portion side and a flange portion provided on an outer peripheral surface of the main body which is the outer peripheral surface located further on a lower side than the gas discharge port. The attachment base holds the flange portion of the inflator, and further, in the attachment base, fastening members to be fastened to a steering main body are arranged at a plurality of positions in a lower surface side around the inflator. In addition, the airbag device is mounted on the steering wheel main body by the fastening members.

However, in the airbag device of the related art, the fastening members are arranged in a portion around the inflator which is located at a position deviated outward from the flange portion of the inflator. Therefore, the external dimension of the attachment base is increased. As a result, that causes an increase in the external dimension of the airbag device, and thus it has been desired to make the airbag device mounted on the steering wheel compact.

SUMMARY

The invention is to solve the problem described above and an object thereof is to provide an airbag device for a steering wheel which can be made compact.

According to a first aspect of the invention, there is provided an airbag device for a steering wheel including: an inflator for supplying an inflation gas to a folded airbag, the inflator including: a main body having a gas discharge portion on an upper portion side; and a flange portion provided on an outer peripheral surface of the main body which is the outer peripheral surface located further on a lower side than the gas discharge port; an attachment base holding the inflator by making the flange portion be attached to the attachment base; fastening members arranged at a plurality positions in a lower surface side around the inflator and mounted on the steering wheel main body by the fastening members, wherein each of the fastening members is disposed such that at least a part of the fastening member is disposed so as to vertically overlap the flange portion in a lower side of the flange portion.

In the airbag device according to the invention, the fastening member to be fastened to the steering wheel main body is arranged not at a position deviated from the flange portion of the inflator so that at least a part thereof overlaps the flange portion below the flange portion. That is, an area of the attachment base where the fastening member is provided can be arranged closer to a center side of the inflator as much as possible. Therefore, it is possible to reduce the external dimension of the attachment base, and thus it is possible to make the external dimension of the airbag device compact in a plan view as much as possible.

Therefore, in the airbag device of the invention, it is possible to make it compact.

According to a second aspect of the invention, in the airbag device according to first aspect, the attachment base may include an attachment plate to which the flange portion of the inflator is attached, a support plate may be disposed below the attachment plate, horn switch bodies may be disposed between the attachment plate and the support plate, the horn switch bodies may be arranged at a plurality of positions around the inflator and each may include: a switch main body which is interposed between the attachment plate and the support plate and has an upper side contact point and a lower side contact point which can operate a horn by being brought into contact with each other; an attachment pin in which the lower side contact point is disposed on an upper surface side and which is prevented from coming off from the switch main body, extends downward from the switch main body through the support plate, and is fastened to a fastening portion of the steering wheel main body; and an urging unit which urges the upper side contact point so as to be separated from the lower side contact point by a horn operating stroke, and each of the horn switch bodies may constitute the fastening member and is disposed such that at least a part of the switch main body is disposed so as to vertically overlap the flange portion on a lower side of the flange portion.

Therefore, in such a configuration, the horn switch mechanism capable of operating the horn can be disposed on the lower portion side of the airbag device by simply arranging the switch main body of the horn switch body in a portion between the attachment plate and the support plate below the attachment plate of the attachment base. Therefore, the attachment portion of the support plate disposed below the attachment base, which is the attachment portion to which the switch main body is attached, can be formed with less steps from other portions, that is, without forming steps of the height dimension of the switch main body by a deep drawing process performed on the attachment portion of the support plate which is a portion attached to the switch main body so as to surround the portion around the attachment portion, and thus it is possible to conveniently dispose the switch main body.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
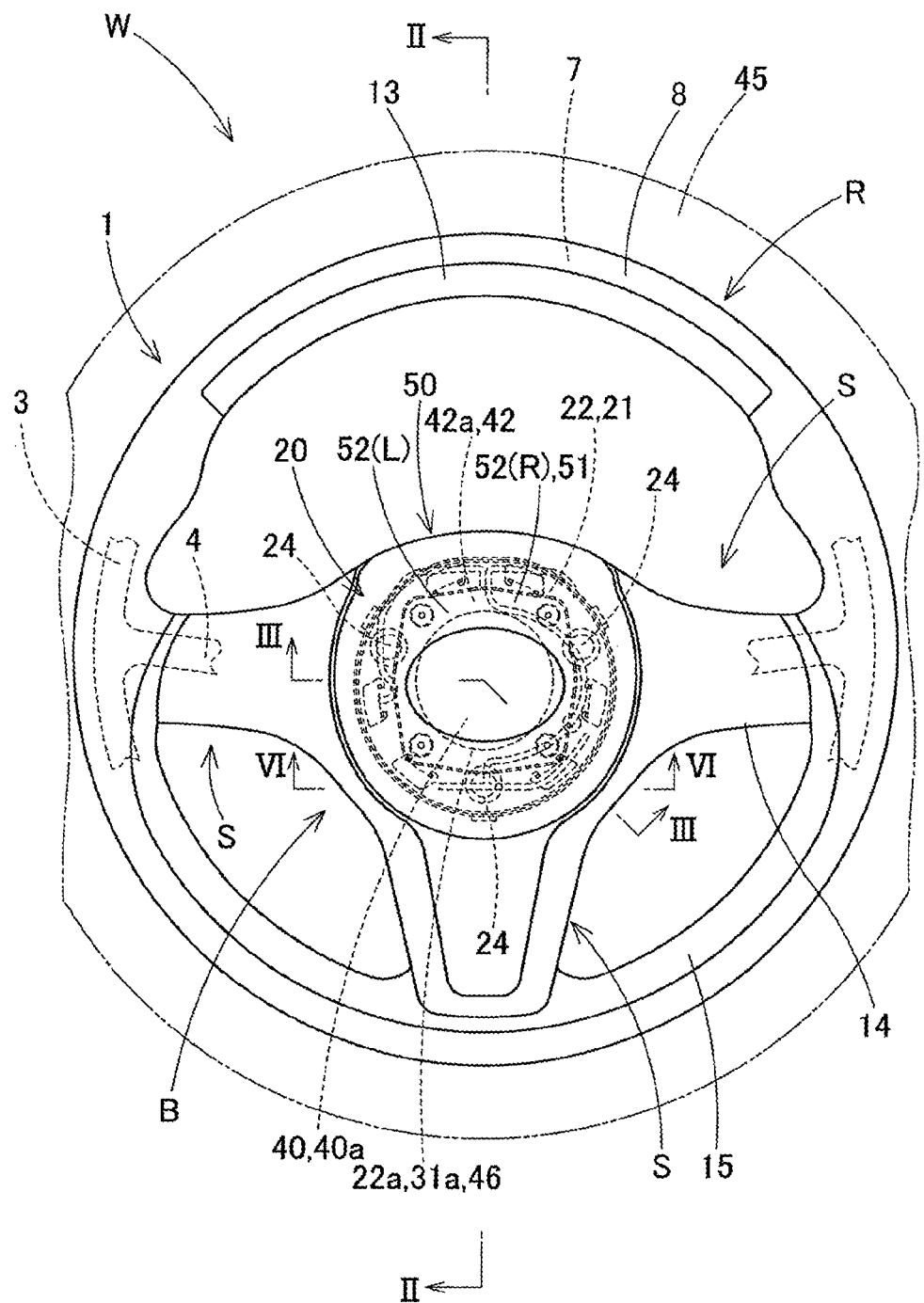
FIG. 1 is a schematic plan view of a steering wheel on which an airbag device according to an embodiment of the invention is mounted.

Hereinafter, an embodiment of the invention will be described with reference to the drawings. As illustrated in FIG. 1, a steering wheel W on which an airbag device 20 of the embodiment is mounted is constituted by including a steering wheel main body 1 having a ring portion R which is grasped during steering, a boss portion B which is disposed at a center of the ring portion R, and a spoke portion S which connects the ring portion R and the boss portion B and the air bag device 20 disposed on an upper portion of the boss portion B.

Further, up-down, right-left, and front-rear directions in the specification are set as follows: Based on straight steering of a vehicle in a state where the steering wheel W is connected and fixed to a steering shaft SS (see FIG. 2) of the vehicle with a nut N, the up-down direction corresponds to an up-down direction along an axial direction of the steering shaft SS, the right-left direction corresponds to a right-left direction of the vehicle in a direction perpendicular to an axis of the steering shaft SS, and the front-rear direction corresponds to a front-rear direction of the vehicle in the direction perpendicular to the axis of the steering shaft SS.

The steering wheel main body 1 is constituted by including a core metal 2 which is arranged so as to connect the ring portion R, the boss portion B, and the spoke portion S to one another and a covering layer 7 which is made of urethane or the like covering the ring portion R and a portion of the core metal 2 of the spoke portions S in the vicinity of the ring portion R. A leather 8 is wrapped around a surface of the covering layer 7. Further, decorative garnishes 13 and 15 are arranged on inner circumferential sides of front and rear portions of the ring portion R.

The core metal 2 is constituted of a ring core metal portion 3 which is disposed in the ring portion R, a boss core metal portion 4 which is disposed in the boss portion B and connected to the steering shaft SS, and spoke core metal portions 5 which are disposed in the right and left spoke portions S and connect the ring core metal portion 3 and the boss core metal portion 4. In the case of the embodiment, the spoke core metal portions 5 are disposed only in portions of the two right and left spoke portions S on the front side and a bezel 14 is arranged in the spoke portion S on the rear portion side so as to surround a periphery of a pad 50 described below.

Figure 2:
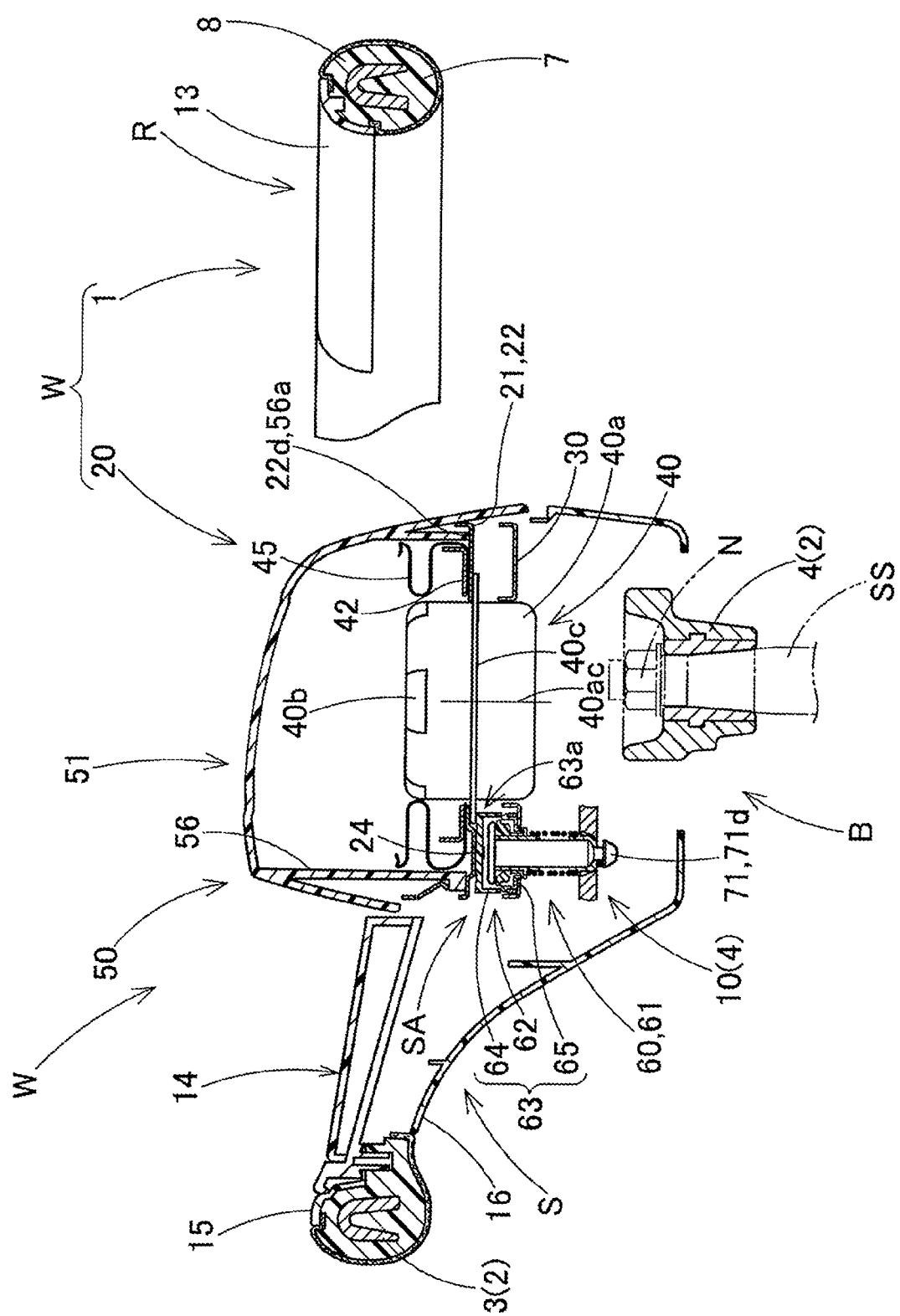
FIG. 2 is a schematic longitudinal cross-sectional view of the steering wheel according to the embodiment and taken along line II-II in FIG. 1.
Figure 3:
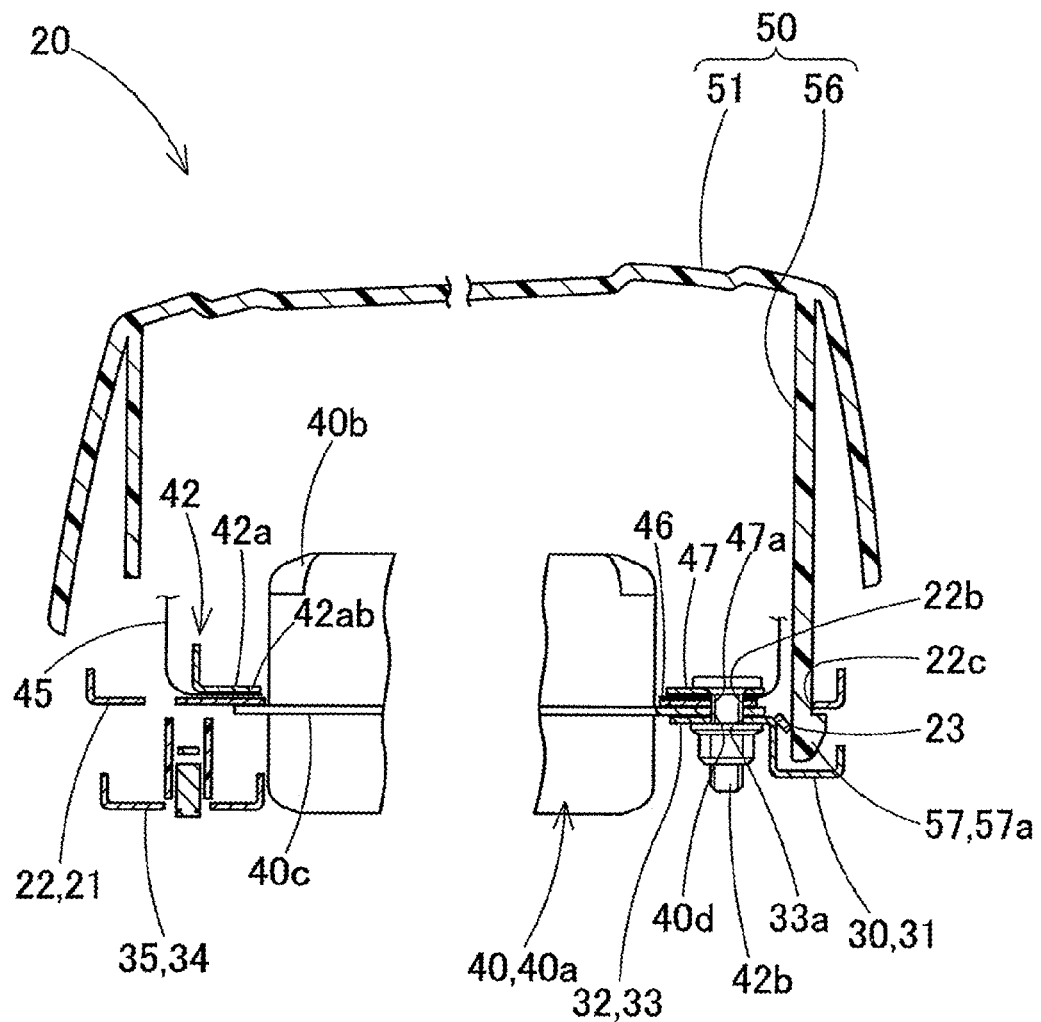
FIG. 3 is a schematic longitudinal cross-sectional view of an airbag device according to the embodiment and taken along line III-III in FIG. 1.
Figure 4:
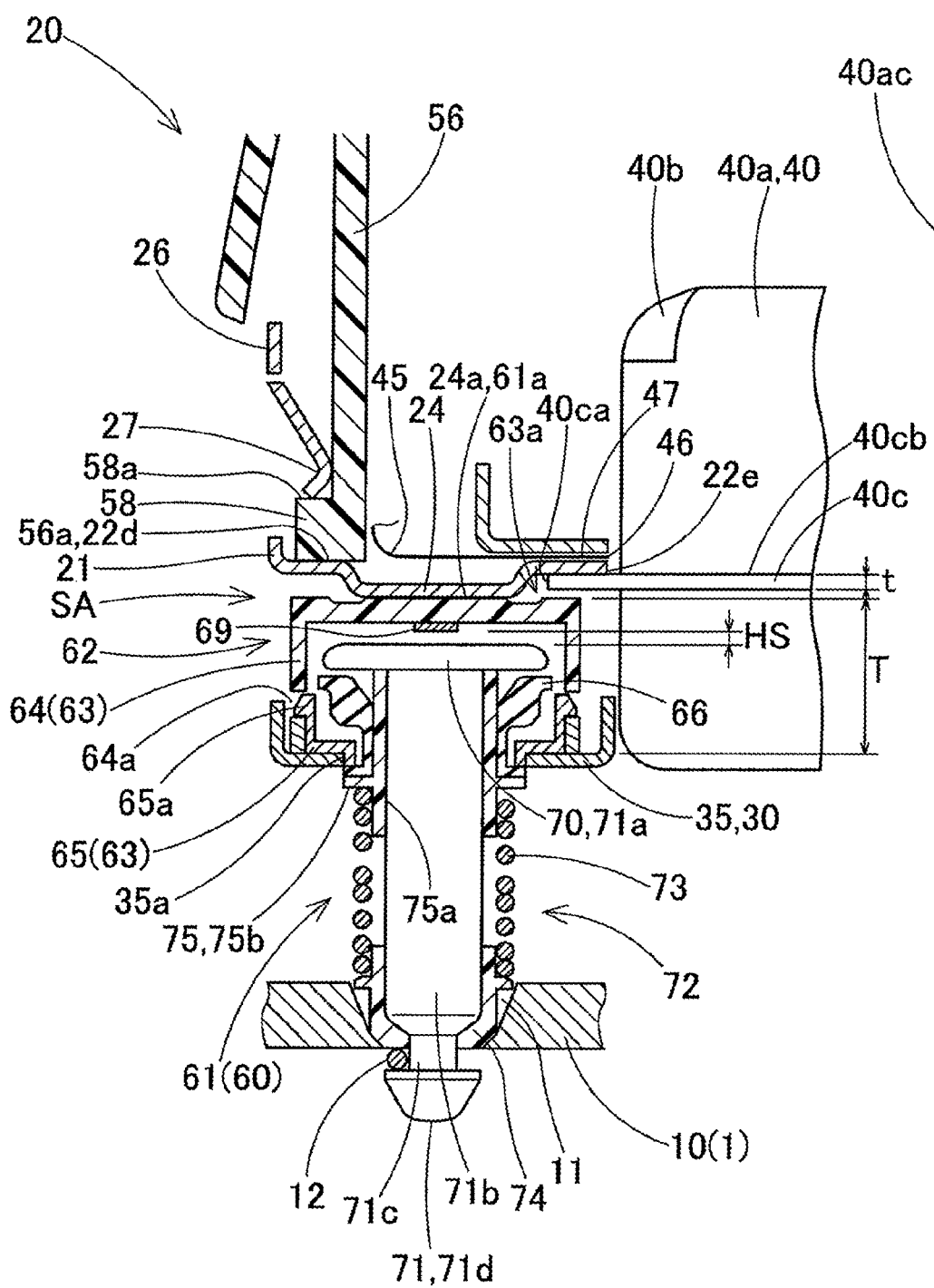
FIG. 4 is a schematic enlarged longitudinal cross-sectional view of a disposition portion of a horn switch body according to the embodiment.
Figure 5:
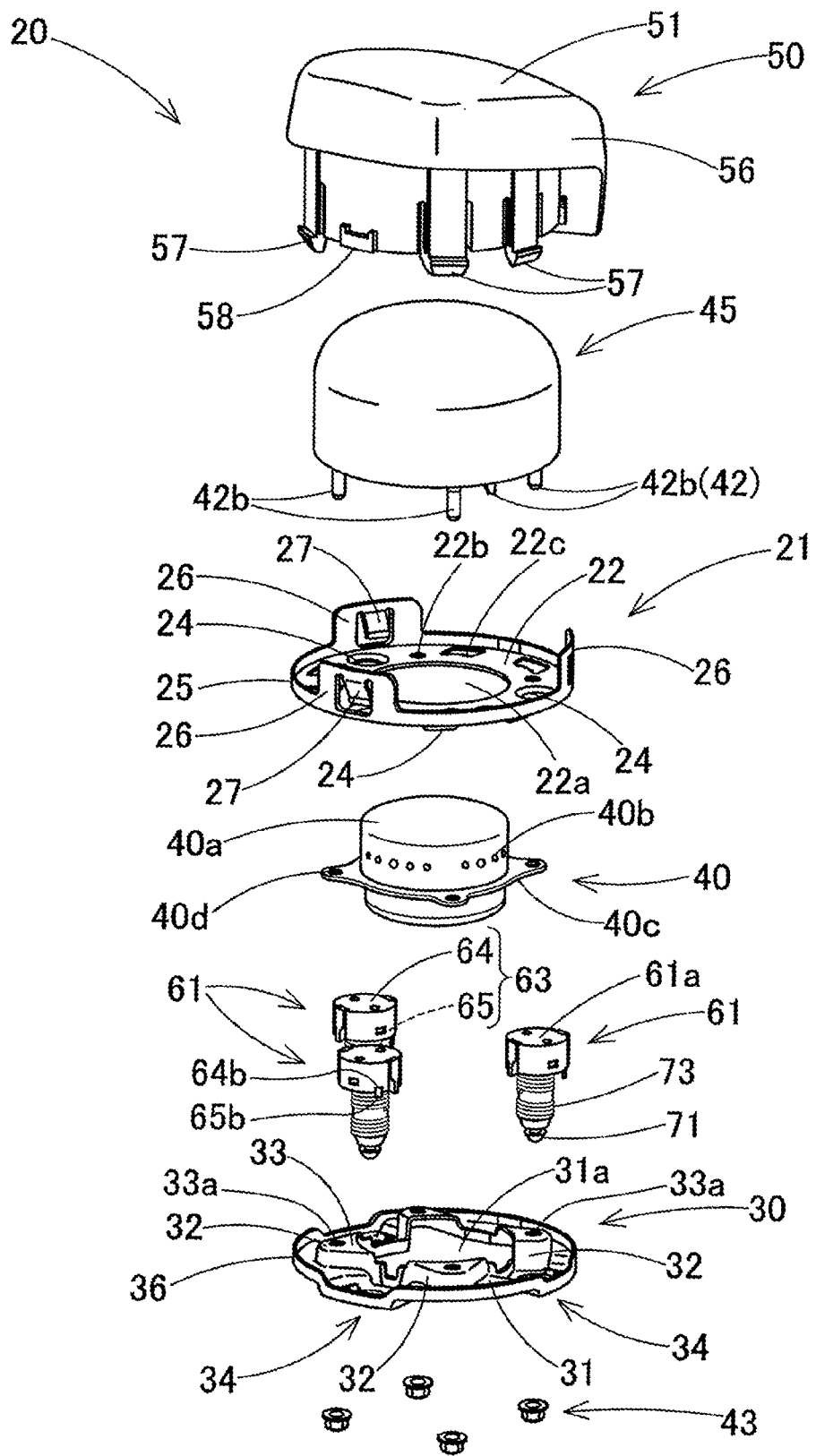
FIG. 5 is a schematic exploded perspective view of the airbag device of the embodiment.
Figure 6:
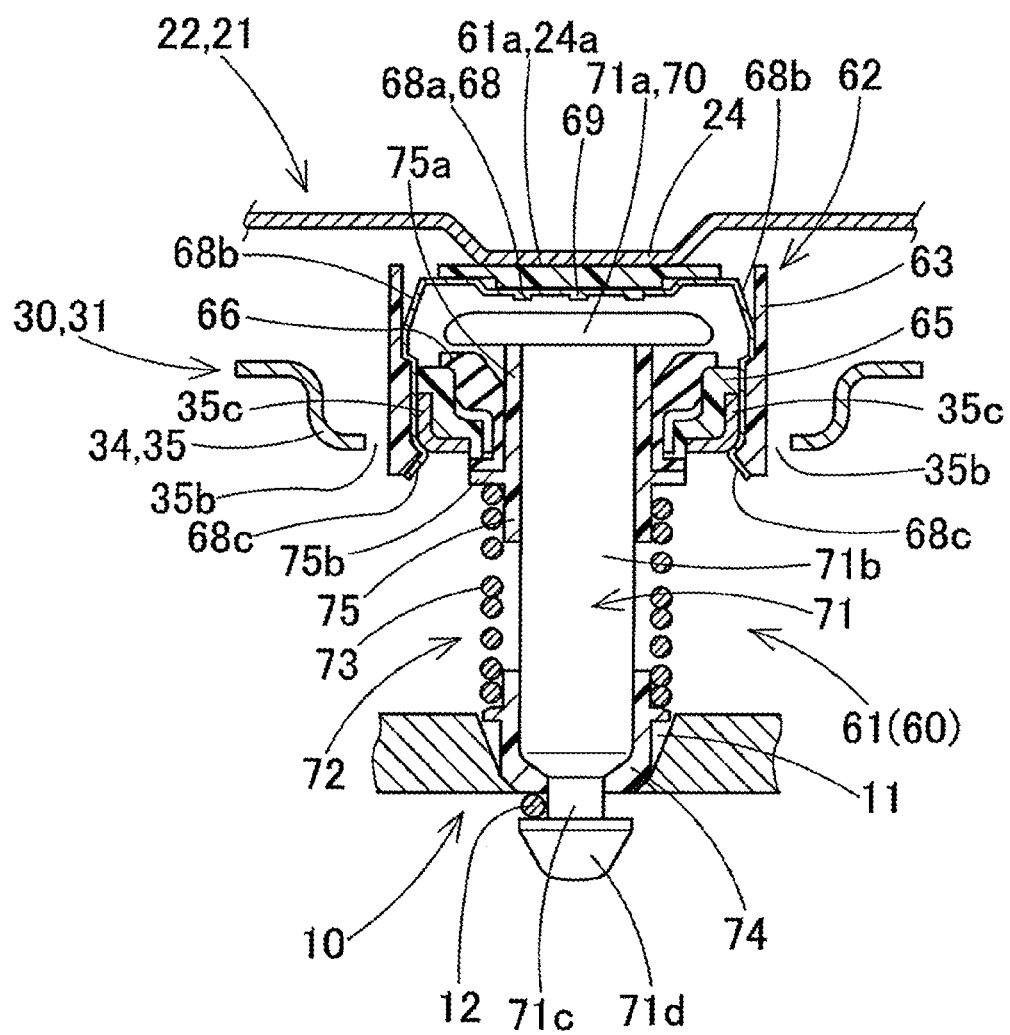
FIG. 6 is a schematic longitudinal cross-sectional view illustrating a fastened state of an attachment pin of the airbag device of the embodiment and the steering wheel main body and taken along line VI-VI in FIG. 1.

A fastening portion 10 for fixing each attachment pin 71 of a horn switch body 61 of a horn switch mechanism 60 of the airbag device 20 is disposed on a peripheral edge of the boss core metal portion 4 of the core metal 2 (see FIGS. 2, 4, and 6). The fastening portion 10 is constituted by arranging a locking hole 11 which penetrates in a downwardly narrowing tapered shape and a locking pin 12 which is arranged on a lower surface side of the boss core metal portion 4 and locks a locking protrusion 71d of the attachment pin 71. The locking pin 12 is formed of a deflectable spring material along a lower surface of the boss core metal portion 4 so as to be recoverable.

Further, the steering wheel main body 1 is constituted by disposing a lower cover 16 on the lower surface side of the boss portion B (see FIG. 2).

As illustrated in FIGS. 1 to 5, the airbag device 20 is constituted by including an airbag 45 which inflates by receiving inflation gas, an inflator 40 for supplying the inflation gas to the airbag 45, the pad 50 which is made of a synthetic resin and disposed on an upper surface side of the boss portion B so as to cover the folded airbag 45, an attachment base 21 which is made of sheet metal and holds the airbag 45, the inflator 40, and the pad 50, a support plate 30 made of sheet metal, and a retainer 42 made of sheet plate. Further, in the airbag device 20, the horn switch mechanism 60 provided with the horn switch body 61 as a fastening member is disposed on a lower portion side.

The airbag 45 has a substantially circular-plate-shaped expansion completed shape with a thickness similar to a spherical shape. In the airbag 45, an inflow opening 46 which is circularly open so as to receive the inflation gas is provided on a lower portion side. Further, four through holes 47a (see FIG. 3) are formed in a peripheral edge 47 of the inflow opening 46 to allow bolts 42b as a fixing unit for the retainer 42 as a fixing unit for the retainer 42 to pass therethrough.

In the inflator 40, a main body 40a of a columnar shape which is provided with a plurality of gas discharge ports 40b for discharging the inflation gas is provided in an upper portion. A flange portion 40c (see FIG. 5) of a square annular shape protrude on an outer peripheral surface of the main body 40a. The flange portion 40c is formed with a through hole 40d through which the bolt 42b of the retainer 42 is passed.

Figure 7:
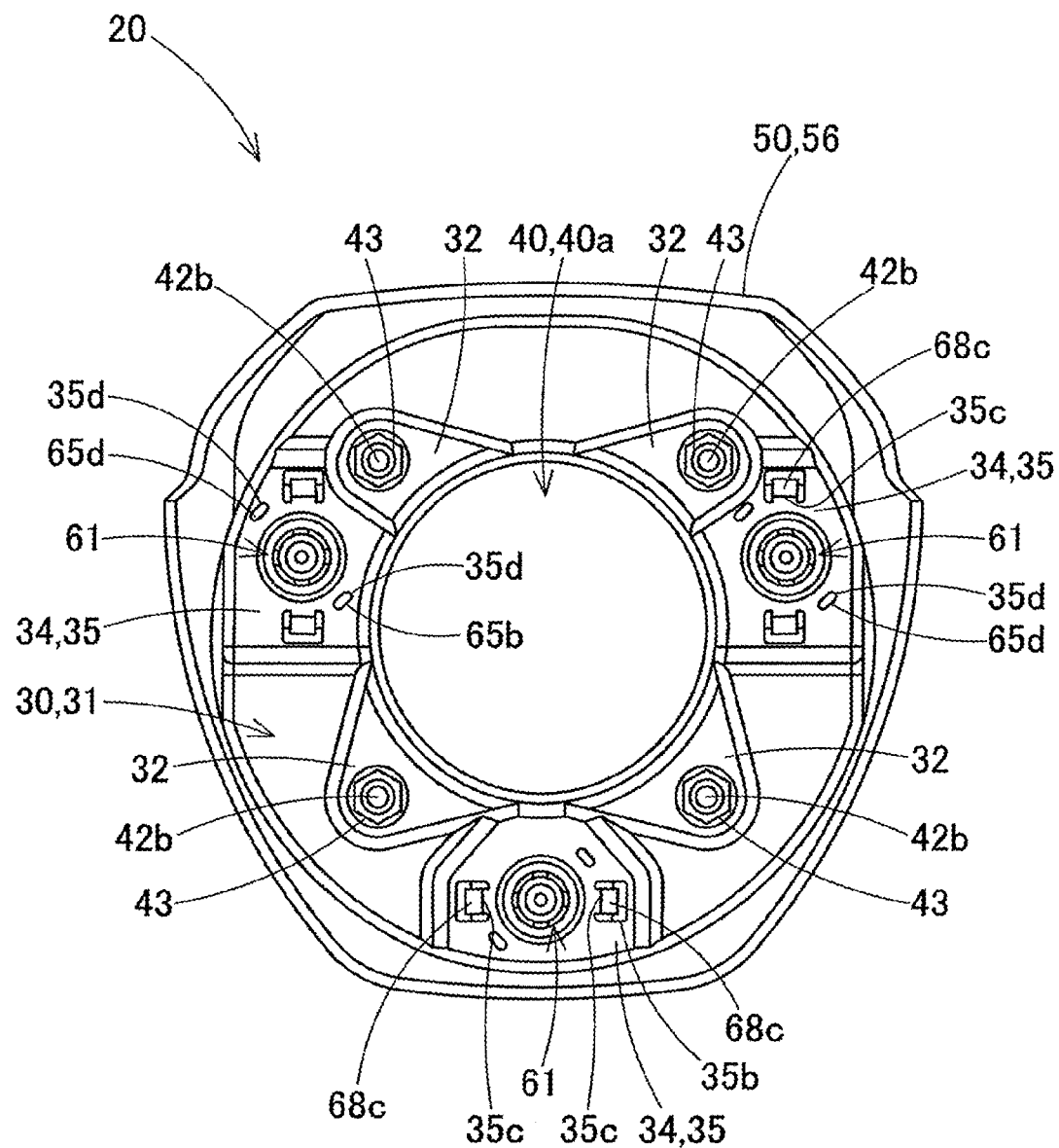
FIG. 7 is a bottom view of the airbag device of the embodiment.
Figure 8:
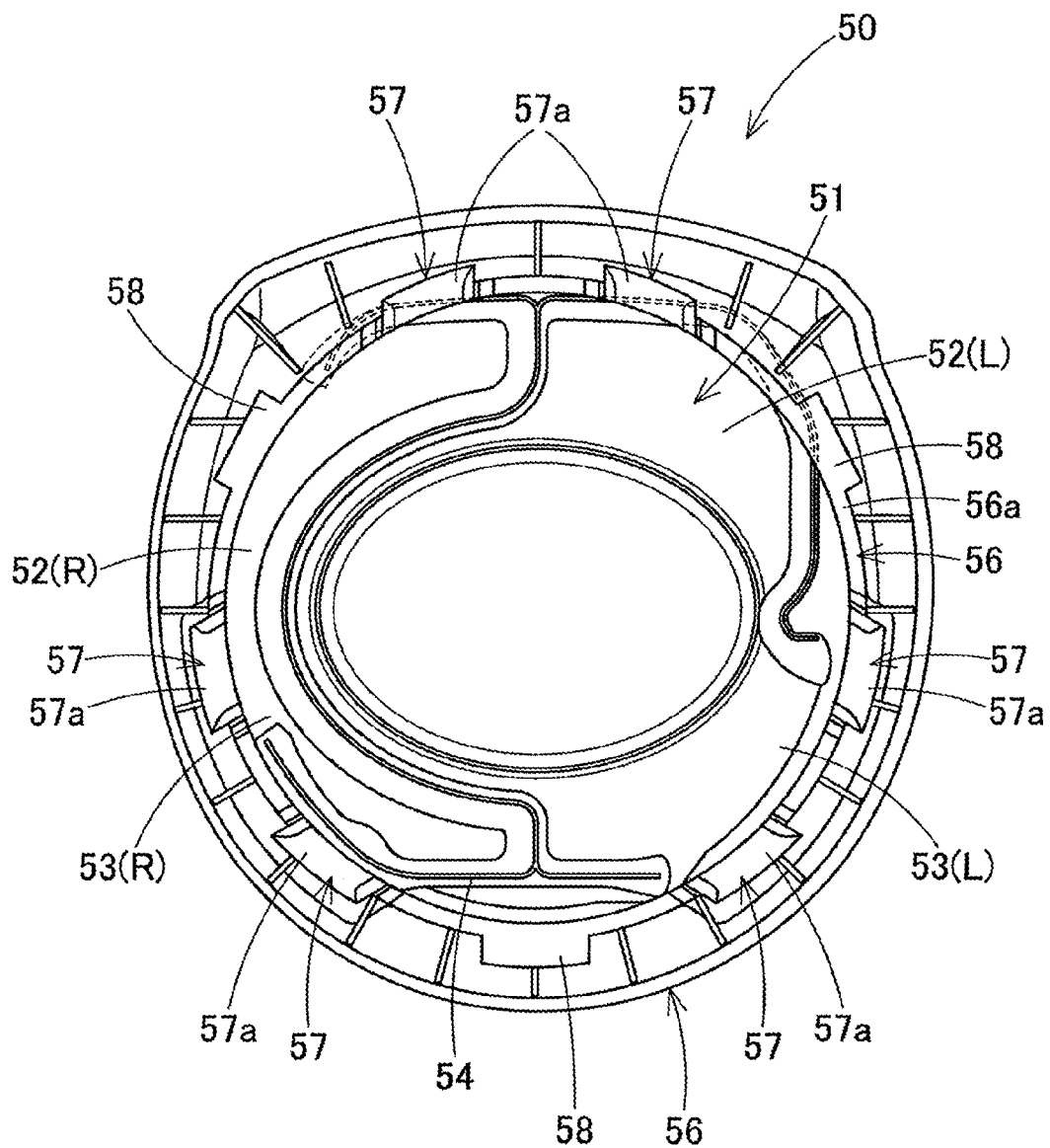
FIG. 8 is a bottom view of a pad of the embodiment.
Figure 9:
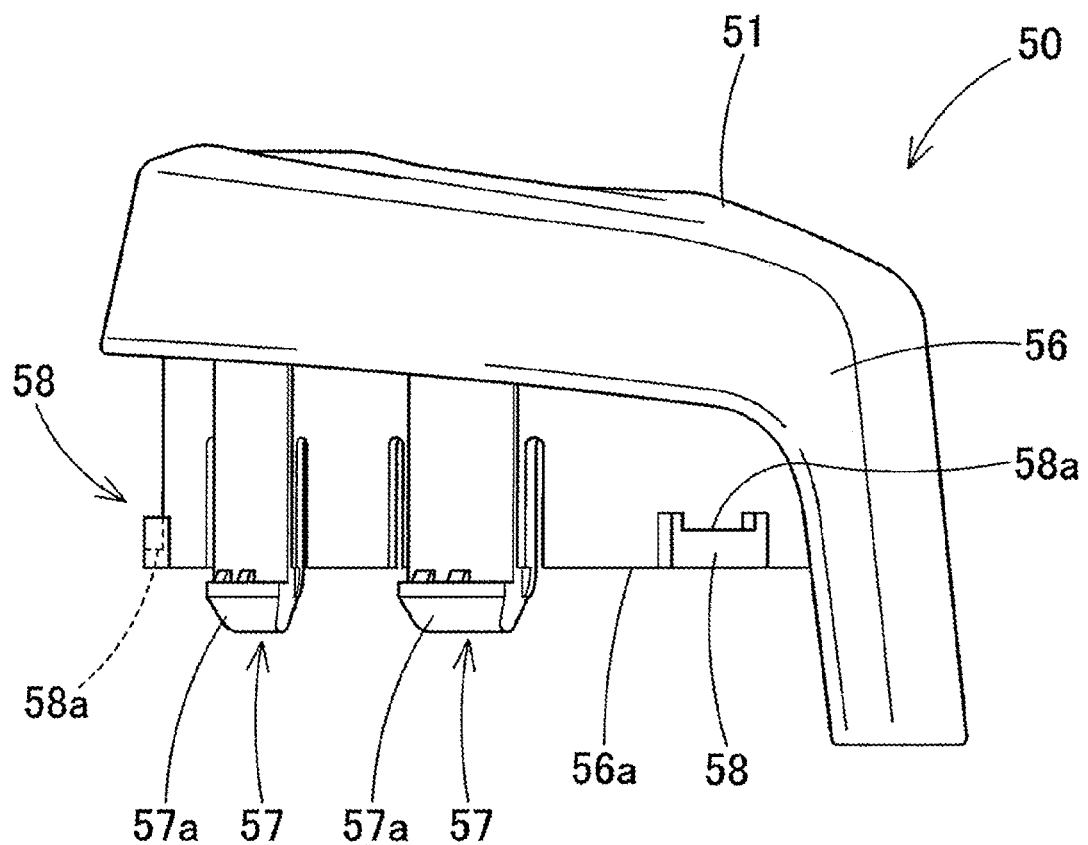
FIG. 9 is a side view of the pad of the embodiment.
Figure 10:
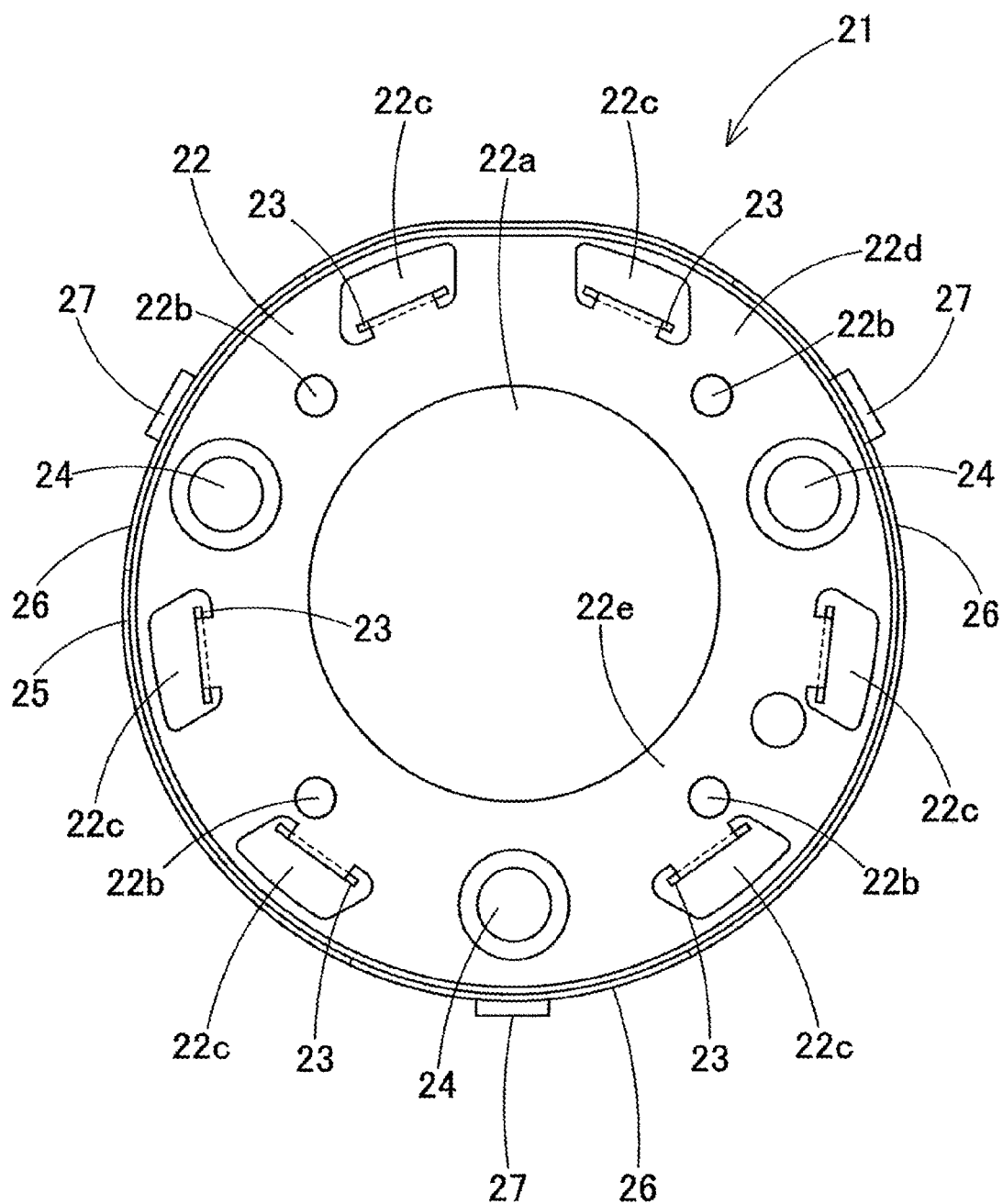
FIG. 10 is a plan view of an attachment base of the embodiment.
Figure 11:
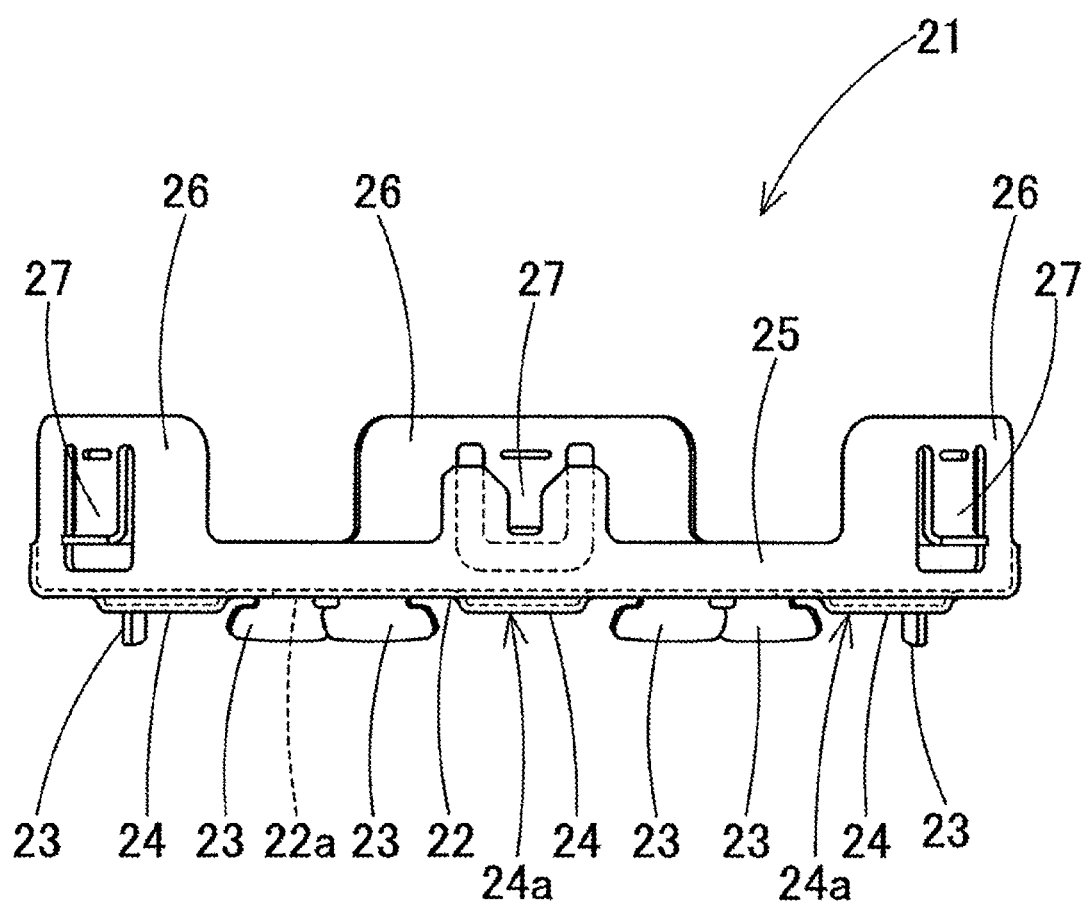
FIG. 11 is a rear view of the attachment base of the embodiment.
Figure 12:
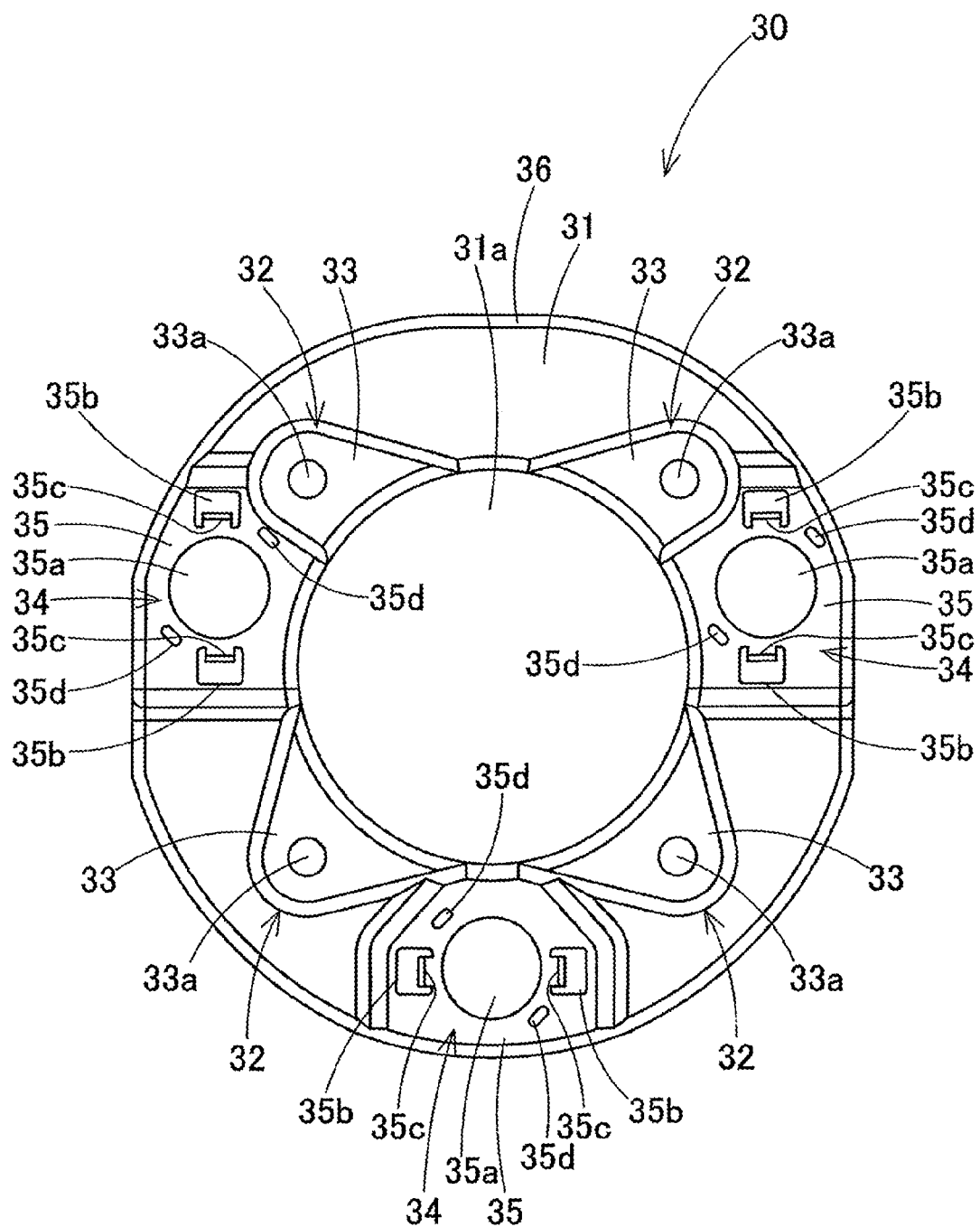
FIG. 12 is a plan view of a support plate of the embodiment.
Figure 13:
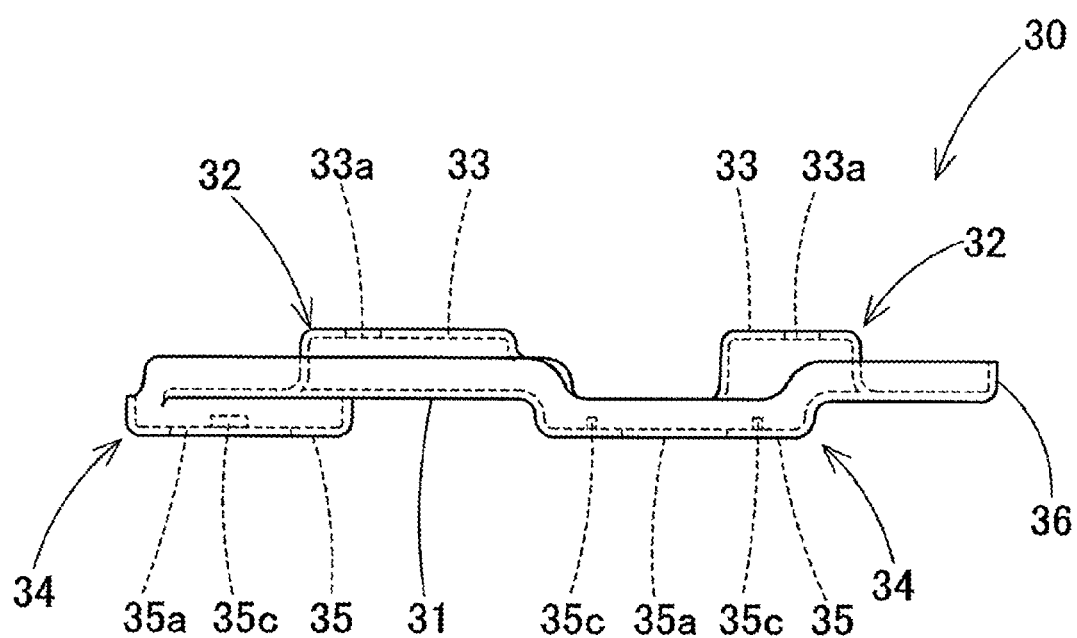
FIG. 13 is a side view of the support plate of the embodiment.

As illustrated in FIG. 1, the retainer 42 is provided with a main body 42a made of a square annular sheet metal and the bolts 42b (see FIGS. 5 and 7) protrude downward are projected at four corners thereof. The retainer 42 is disposed on the peripheral edge 47 of the inflow opening 46 in the airbag 45 and each bolt 42b passes through the through hole 47a of the airbag 45, a through hole 22b of the attachment base 21, the through hole 40d of the flange portion 40c of the inflator 40, and a through hole 33a of the support plate 30 in order, and further, a nut 43 is fastened to each bolt 42b, thereby the airbag 45, the inflator 40, and the support plate 30 are attached to the attachment base 21 (see FIG. 3).

As illustrated in FIGS. 1 to 3, 5, 8, and 9, the pad 50 is made of a synthetic resin such as an olefinic thermoplastic elastomer and is disposed on an upper surface side of the boss portion B in a vicinity of the center of the steering wheel W. The pad 50 is constituted by including a ceiling wall portion 51 which cover an upper side of the airbag 45 folded and accommodated inside the boss portion B and a side wall portion 56 which extends substantially in a cylindrical shape from a lower surface of the ceiling wall portion 51 and covers lateral sides (outer peripheral sides) of the front, rear, right, and left sides of the folded airbag 45.

In the ceiling wall portion 51, door portions 52 (L, R) which are pushed by the inflating airbag 45 and open on both the left and right sides are disposed. The door portion 52 (L, R) is constituted by providing hinge portions 53 (L, R) on an outer edge side in a right-left direction and providing a thin breakage expected portion 54 around the periphery except the hinge portions 53L and 53R.

As illustrated in FIGS. 3, 4, 5, 8, and 9, in the side wall portion 56 of the pad 50, two locking leg portions 57 are provided at each of lower ends on a front edge side and right and left rear edge sides and one locking protrusion portion 58 is dispose at each of outer peripheral surface sides on a rear edge side and right and left front edge sides. Each locking leg portion 57 is inserted into a locking hole 22c provided in an attachment plate 22 of the attachment base 21 and pushed outward by a locking claw portion 23 of a peripheral edge of the locking hole 22c, so a locking head portion 57a in a tip end is locked to a peripheral edge of the locking hole 22c (see FIG. 3). Each locking protrusion portion 58 is pushed against the inside of each locking claw portion 27 of the attachment base 21, and thus a locking surface 58a of each locking protrusion portion 58 is locked to each locking claw portion 27 (see FIG. 4). Then, in a state where a lower end surface 56a of the side wall portion 56 abuts on an upper surface 22d of the attachment plate 22 of the attachment base 21, by locking of the locking head portion 57a of each locking leg portion 57 with respect to the peripheral edge of the locking hole 22c and locking of the locking surface 58a of each locking protrusion portion 58 by each locking claw portion 27, the pad 50 is attached to the attachment base 21 without shifting upward or downward or shifting back and forth and to the left and right.

As illustrated in FIGS. 2 to 6, 10, and 11, the attachment base 21 is made of sheet metal and holds the airbag 45, the inflator 40, the pad 50, and the support plate 30. Further, the attachment base 21 is configured as a member made of sheet metal which attaches the airbag device 20 to the steering wheel main body 1 side using the horn switch body 61 as a fastening member. The attachment base 21 is constituted by including the attachment plate 22 of a substantially annular shape and a side wall portion 25 protruding upward from an outer peripheral edge of the attachment plate 22.

In the attachment plate 22, an insertion hole 22a which is open in a circular shape and used for inserting the columnar main body 40a of the inflator 40 is disposed at the center and the through hole 22b which allows each bolt 42b of the retainer 42 to pass therethrough is disposed around the insertion hole 22a. Further, on a rear edge side and right and left front edge sides of the peripheral edge of the insertion hole 22a of the attachment plate 22, support seats 24 for restricting the position of respective horn switch bodies 61 by making a lower surface 24a side abut on an upper surface 61a side of the respective horn switch bodies 61.

In a vicinity of an outer peripheral surface 40ca of the flange portion 40c of the inflator 40, each support seat 24 protrudes downward from a peripheral edge portion 22e of the insertion hole 22a with a truncated conical step. Particularly, each support seat 24 protrudes downward from the peripheral edge portion 22e of the insertion hole 22a of the attachment plate 22 such that the lower surface 24a is disposed apart from an upper surface 40cd of the flange portion 40c of the inflator 40 by a thickness dimension t of the flange portion 40c or more.

Further, the locking hole 22c for allowing each locking leg portion 57 of the pad 50 to be inserted therethrough and locking the locking leg portion 57 is open in a portion between the support seats 24. Further, in a state before deformation, the locking claw portion 23 which extends downward so as to be perpendicular to the attachment plate 22 is disposed on a peripheral edge of each locking hole 22c, which is the peripheral edge on the insertion hole 22a side. Each locking claw portion 23 makes the locking leg portion 57 be subjected to bending deformation so as to be pushed against the peripheral edge on the outer edge side of the locking hole 22c after the locking leg portion 57 is inserted into the locking hole 22c, in such a manner that the locking head portion 57a of the locking leg portion 57 is locked to an outer-edge-side peripheral edge of the locking hole 22c (see FIG. 3).

In the side wall portion 25 of the outer peripheral edge of the attachment plate 22, protrusion portions 26 extending upward are disposed on the rear edge side and the left and right front edge sides. Each protruding portion 26 is provided with the locking claw portion 27 for being locked to the locking surface 58a of the locking protrusion portion 58 provided in the side wall portion 56 of the pad 50. Each locking claw portion 27 is disposed on an inner peripheral side of each protrusion portion 26 such that a lower end surface 56a of the side wall portion 56 of the pad 50 is abut on an upper surface 22d of the attachment plate 22, and then the locking claw portion 27 is subjected to bending deformation toward the inner side. Therefore, the locking claw portion 27 locks the locking surface 58a of the locking protrusion portion 58.

When the lower end surface 56a of the side wall portion 56 of the pad 50 is abut on the upper surface 22d of the attachment plate 22, the lower end surface 56a abuts on the upper surface 22d of the attachment plate 22 outside each support seat 24.

As illustrated in FIGS. 2 to 7, 12, and 13, in the support plate 30, a plate main body 31 of an annular shape which has an insertion hole 31a which is circularly open so that the main body 40a of the inflator 40 is inserted therethrough is provided in a center. Further, in the plate main body 31, an upper step portion 32 which rises upward so as to provide a step and a lower step portion 34 where a step recessed downward is provided are disposed.

The upper step portion 32 is provided with a connecting plate 33 provided with the through hole 33a through which each bolt 42b of the retainer 42 passes and the connecting plates 33 of the upper step portions 32 are disposed at four positions on the periphery of the insertion hole 31a. The nut 43 fastened to the bolt 42b abuts on the lower surface side of the connecting plate 33 (see FIG. 3).

When each bolt 42b of the retainer 42 fixes the plate main body 31 integrally with the flange portion 40c of the inflator 40 and the attachment plate 22, the lower step portion 34 is disposed immediately below each support seat 24 of the attachment plate 22. Each lower step portion 34 constitutes an attachment seat 35 for attaching the horn switch body 61. In the attachment seat 35, an insertion hole 35a through which the attachment pin 71 of the horn switch body 61 and a sliding cylindrical portion 67a of a sleeve 67 surrounding the attachment pin 71 are inserted is provided and a pair of locking holes 35b and a pair of positioning holes 35d are disposed on both sides of the insertion hole 35a. On the peripheral edge on the insertion hole 35a side of the locking hole 35b, a locking claw 35c extending upward with an L-shaped cross section is disposed (see FIGS. 6, 12, and 13).

On the outer peripheral edge of the plate main body 31, a reinforcing rib 36 extending upward is disposed.

A switch main body 62 of the horn switch body 61 is disposed between the support seat 24 of the attachment plate 22 of the attachment base 21 and the attachment seat 35 of the plate main body 31 of the support plate 30 (FIGS. 2 and 4 to 7).

The horn switch body 61 constitutes the horn switch mechanism 60 of the airbag device 20 and disposed immediately below each support seat 24 around the inflator 40. Each horn switch body 61 is constituted by including a switch main body 62, the attachment pin 71 fastened to the fastening portion 10 of the steering wheel main body 1, and an urging unit 72 (see FIGS. 4 and 6).

The switch main body 62 is interposed between the support seat 24 of the attachment plate 22 and the attachment seat 35 of the support plate 30 and includes a movable side contact point 69 as an upper side contact point and a fixed side contact point 70 as a lower side contact point which are capable of operating a horn by bringing them into contact with each other. In the switch main body 62, a movable side contact member 68 having a movable side contact point 69 on the upper portion 64 side in a substantially cylindrical case 63 which is formed by coupling an upper portion 64 and a lower portion 65 made of a synthetic resin is assembled.

The movable side contact member 68 is formed of a plate material such as a copper plate having electrical conductivity and includes a lateral rod portion 68a provided with a movable side contact point 69 and a vertical rod portion 68b extending downward from both edges of the lateral rod portion 68a (see FIG. 6). Further, the movable side contact member 68 is constituted by providing a locking claw portion 68c engaging with the locking claw 35c of the attachment seat 35 of the support plate 30 at the lower end of the vertical rod portion 68b.

In the embodiment, each horn switch body 61 as a fastening member is disposed such that the upper portion 64 of the case 63 which is a part of the switch main body 62 is disposed to overlap the flange portion 40c in the up-down direction on the lower side of the flange portion 40c of the inflator 40.

In the lower portion 65 of the case 63, locking claws 65a are provided at two positions in a predetermined position. Further, the upper portion 64 includes a locking hole 64a for locking the locking claw 65a (see FIG. 4). In addition, the lower portion 65 includes a positioning protrusion 65b to be inserted into the positioning hole 35d of the attachment seat 35 of the support plate 30 and the vicinity thereof is fitted into a fitting hole 64b of the upper portion 64 (see FIG. 5). Therefore, in the upper portion 64 and the lower portion 65, when the locking claw 65a is locked to the locking hole 64a, the upper portion 64 and the lower portion 65, the lower portion 65 does not come off from the upper portion 64 and a vicinity of the positioning protrusion 65b abuts on the fitting hole 64b, whereby the approaching position of both portions are defined. Therefore, the upper portion 64 and the lower portion 65 form a substantially cylindrical case 63 without expanding and contracting.

The attachment pin 71 is formed from a steel rod or the like and constituted by including a head portion 71a of a flange shape which is disposed below the movable side contact point 69 in the case 63 and a shaft portion 71b extending downward from the head portion 71a. In the shaft portion 71b, the locking protrusion 71d provided with a locking groove 71c is provided in a lower end, the locking protrusion 71d is inserted into the locking hole 11 of the fastening portion 10 of the steering wheel main body 1 and the locking protrusion 71d is locked to the locking pin 12 inserted into the locking groove 71c, whereby the shaft portion 71b is fastened to the fastening portion 10 of the steering wheel main body 1.

In a case of the embodiment, the head portion 71a on the upper surface side of the attachment pin 71 constitutes the fixed side contact point 70. The head portion 71a of the attachment pin 71 has an outer dimension where the head portion 71a does not come out downward from the lower portion 65 of the case 63.

The attachment pin 71 is fastened to the fastening portion 10 of the core metal 2 of the steering wheel main body 1, and therefore, the fixed side contact point 70 conducts to a negative electrode side of a horn operating circuit. Further, the movable side contact point 69 locks the locking claw portion 68c of the movable side contact member 68 to the locking claw 35c of the support plate 30 conducting to a positive electrode side of the horn operating circuit so as be come into contact with the positive electrode side, and therefore the movable side contact point 69 conducts to the positive electrode side of the horn operating circuit. As a result, when the contact points 69 and 70 come into contact with each other, the horn operating circuit is closed and energized to operate the horn.

The urging unit 72 urges the movable side contact point 69 so as to be separated from the fixed side contact point 70 by a horn operating stroke HS (see FIG. 4). In a case of the embodiment, the urging unit 72 is constituted by including a spring seat 74 fitted to the locking groove 71c of the attachment pin 71, a coil spring 73 disposed around the shaft portion 71b, and a sleeve 75. The sleeve 75 is constituted by including a sliding cylindrical portion 75a which has a cylindrical shape and is slidably disposed on the shaft portion 71b of the attachment pin 71 and a flange portion 75b disposed on an outer peripheral surface of the sliding cylindrical portion 75a. The flange portion 75b supports an upper end of the coil spring 73 of which a lower end is supported by the spring seat 74 and abuts on the lower portion 65 of the case 63.

The coil spring 73 urges the airbag device 20 upward via the case 63 and the flange-shaped head portion 71a of the attachment pin 71 locks the lower portion 65 of the case 63, that is, it is prevented from coming out from the case 63, and therefore, the coil spring 73 regulates the raised position of the airbag device 20 via the case 63. In addition, the movable side contact point 69 provided in the upper portion 64 of the case 63 is separated from the fixed side contact point 70 by an urging force of the coil spring 73 and the movable side contact point 69 is separated upward from the fixed side contact point 70 by a distance separated from the fixed side contact point 70, that is, the horn operating stroke HS. Therefore, the position of the movable side contact point 69 is regulated by the head portion 71a of the attachment pin 71 locking the lower portion 65 of the case 63.

Further, a damper 66 made of an annular rubber or the like for preventing generation of abnormal noise is disposed between the head portion 71a of the attachment pin 71 and the lower portion 65.

In the horn switch body 61, when the pad 50 of the airbag device 20 is pressed in a state where the airbag device 20 is fastened to the steering wheel main body 1, the support seat 24 of the attachment base 21 on which the lower end surface 56a of the side wall portion 56 of the pad 50 abuts is lowered. Then, the case 63 on which the lower surface 24a of the support seat 24 abuts is lowered with the support seat 24 and the attachment seat 35, and therefore the movable side contact point disposed on a lower surface of the upper portion 64 of the case 63 is also lowered. In this case, the attachment pin 71 is fixed to the fastening portion 10 of the steering wheel main body 1 and the fixed side contact point 70 constituted of the head portion 71a at the upper end does not change the height position. Therefore, the case 63 provided with the movable side contact point 69 compresses the coil spring 73 of the urging unit 72 and is lowered. As a result, the movable side contact point 69 is brought into contact with the fixed side contact point 70 to operate the horn.

In the airbag device 20 of the embodiment, when the airbag device 20 is assembled, the retainer 42 is inserted in the inner portion of the airbag 45 in a state where each bolt 42b protrudes from the through hole 47a and the airbag 45 is folded, then the airbag 45 is wrapped with a wrapping material (not illustrated) for the prevention of bending collapse. In addition, the locking claw portion 68c is locked to the locking claw 35c of the locking hole 35b in a state where the shaft portion 71b of the attachment pin 71 protrudes from the insertion hole 35a, in such a manner that the assembled horn switch body 61 is attached to each attachment seat 35 in the plate main body 31 of the support plate 30 in advance.

Next, the peripheral edge 47 of the inflow opening 46 of the airbag 45 is disposed on the peripheral edge portion 22e of the insertion hole 22a of the attachment base 21 and each bolt 42b of the retainer 42 passes through the through hole 22b of the attachment base 21. Further, the main body 40a of the inflator 40 is inserted into the airbag 45 through the insertion hole 22a of the attachment base 21 and the flange portion 40c of the inflator 40 and the connecting plate 33 of the support plate 30 are disposed below the peripheral edge portion 22e of the attachment base 21. Next, each bolt 42b of the retainer 42 which protrudes from the through hole 22b of the attachment base 21 passes through the through hole 40d of the inflator 40 and the through hole 33a of the support plate 30, then the nut 43 is fastened to each bolt 42b. As a result, the airbag 45, the inflator 40, and the support plate 30 can be attached to the attachment base 21.

Next, the airbag 45 is covered with the pad 50 and the side wall portion 56 is moved closer to the attachment base 21 such that the lower end surface 56a of the side wall portion 56 abuts on the upper surface 22d of the attachment plate 22. Further, each locking leg portion 57 on the lower end of the side wall portion 56 passes through the locking hole 22c of the attachment base 21 and the locking claw portion 23 is bent and brought into contact with each locking leg portion 57, in such a manner that the locking head portion 57a of each locking leg portion 57 is locked to the peripheral edge of the locking hole 22c. Then, when each locking claw portion 27 of the side wall portion 25 of the attachment base 21 is bent and each locking claw portion 27 is locked to the locking surface 58a of each locking protrusion portion 58 of the side wall portion 56 of the pad 50, the pad 50 is joined to the attachment base 21. As a result, assembling of the airbag device 20 is completed.

Mounting airbag device 20 on a vehicle is performed as follows. When the locking protrusion 71d of the attachment pin 71 of each horn switch body 61 is inserted into the locking hole 11 of each fastening portion 10 of the steering wheel main body 1 which is assembled to the steering shaft SS and the locking pin 12 is fitted into the locking groove 71c, the airbag device 20 can be attached to the steering wheel main body 1. As a result, assembling of the steering wheel W is completed and the steering wheel W can be mounted on a vehicle with the airbag device 20.

When the airbag device 20 is attached to the steering wheel main body 1, a lead wire (not illustrated) of the support plate 30 is connected to the positive electrode side of the horn operating circuit and a lead wire (not illustrated) for inputting an operation signal is connected to the inflator 40.

When an operation signal is input to the inflator 40 after the airbag device 20 is mounted on a vehicle, the inflation gas is discharged from the gas discharge port 40b. Therefore, the folded airbag 45 inflates by receiving the inflation gas. Then, the airbag 45 pushes and opens the door portion 52 (L, R) of the ceiling wall portion 51 of the pad 50 to the left and right sides and protrudes from the opening of the door portion 52 (L, R). As a result, the airbag 45 is deployed and inflates so as to cover the upper surface of the ring portion R from above the boss portion B (see the two-dot chain line in FIG. 1).

Also, when the pad 50 is pressed so as to operate the horn switch mechanism 60 during normal use when the inflator 40 is not operating, the support seat 24 of the attachment base 21 which abuts on the lower end surface 56a of the side wall portion 56 is lowered, and further the case 63 on which the lower surface 24a of the support seat 24 abuts is lowered with the support seat 24 and the attachment seat 35. Therefore, the movable side contact point 69 disposed on the lower surface of the support portion 64 of the case 63 is also lowered. In this case, the attachment pin 71 is fixed to the fastening portion 10 of the steering wheel main body 1 and the height position of the fixed side contact point 70 which is constituted of the head portion 71a in the upper end is not changed. Therefore, the case 63 provided with the movable side contact point 69 is lowered by compressing the coil spring 73 of the urging unit 72 and the movable side contact point 69 is brought into contact with the fixed side contact point 70. As a result, the horn can be operated.

In the airbag device 20 of the embodiment, as illustrated in FIG. 4, the case 63 of the horn switch body 61 as the fastening member for being fastened to the steering wheel main body 1 is arranged not at a position deviated from the flange portion 40c of the inflator 40 so that at least a part (the outer peripheral edge portion of the case 63) 63a overlaps the flange portion 40c below the flange portion 40c. That is, an area SA of the attachment base 21 where the horn switch body 61 as the fastening member is provided can be arranged closer to a center 40ac side of the inflator 40 as much as possible. Therefore, it is possible to reduce the external dimension of the attachment base 21, and thus it is possible to make the external dimension of the airbag device 20 compact in a plan view as much as possible.

Therefore, in the airbag device 20 of the embodiment, it is possible to make it compact.

In the airbag device 20 of the embodiment, the attachment base 21 includes the attachment plate 22 to which the flange portion 40c of the inflator 40 is attached and the support plate 30 is disposed below the attachment plate 22, and further the horn switch body 61 is disposed between the attachment plate 22 and the support plate 30. In addition, the horn switch bodies 61 are disposed at a plurality (three in the embodiment) of positions around the inflator 40 and each horn switch body 61 is interposed between the attachment plate 22 and the support plate 30 and constituted by including the switch main body 63 having the upper side contact point 69 and the lower side contact point 70 which can operate the horn by being brought into contact with each other, the attachment pin 71, and the urging unit 72. The lower side contact point 70 is disposed on an upper surface side of the attachment pin 71 and the attachment pin 71 is prevented from coming off from the switch main body 62. Further, the attachment pin 71 extends downward from the switch main body 62 through the support plate 30 and is fastened to the fastening portion 10 of the steering wheel main body 1. The urging unit 72 urges the upper side contact point 69 so as to be separated upward from the lower side contact point 70 by the horn operating stroke HS. In addition, each horn switch body 61 constitutes the fastening member and at least the part (the outer peripheral edge portion of the case 63) 63*a* of the switch main body 62 of each horn switch body 61 is disposed such that the part 63*a* vertically overlaps the flange portion 40*c* below the flange portion 40*c*.

Therefore, in the embodiment, the horn switch mechanism 60 capable of operating the horn can be disposed on the lower portion side of the airbag device 20 by simply arranging the switch main body 62 of the horn switch body 61 in a portion between the attachment plate 22 and the support plate 30 below the attachment plate 22 of the attachment base 21. Therefore, in the embodiment, the switch main body 62 can be conveniently attached to the attachment seat 35 which is a flat part on the upper surface side of the support plate 30, and thus it is possible to arrange the switch main body 62 conveniently without performing a deep drawing process on the attachment portion (attachment seat) 35 so as to surround a portion around the attachment portion 35.

Therefore, in the embodiment, the horn switch mechanism 60 capable of operating the horn can be disposed on the lower portion side of the airbag device 20 by simply arranging the switch main body 62 of the horn switch body 61 in the portion between the attachment plate 22 and the support plate 30 below the attachment plate 22 of the attachment base 21. As a result, the attachment portion (attachment seat) 35 of the support plate 30 disposed below the attachment base 21, which is the attachment portion 35 to which the switch main body 62 is attached, can be formed with less steps from other portions (that is, without forming steps of the height dimension T of the switch main body 62 by a deep drawing process performed on the attachment portion (attachment seat) 35 of the support plate 30 which is a portion attached to the switch main body 62 so as to surround the portion around the attachment portion 35), and thus it is possible to conveniently dispose the switch main body 62.

In an airbag device of the related art disclosed in JP-A-2016-084005, as similar to the embodiment, a horn switch mechanism is disposed below the airbag device. However, in the horn switch mechanism in JP-A-2016-084005, a switch main body provided with contact points which operate a horn by being brought into contact with each other is accommodated in an accommodation portion which is formed by a deep drawing process so as to recess downward in and outer area deviated from an attachment plate of an attachment base to which a flange portion of an inflator is attached to an outer side of the flange portion of the inflator, and further the accommodation portion is subjected to a deep drawing process by the height dimension of the switch main body below the flange portion. As a result, manufacturing management is troublesome so as to prevent cracks from occurring in a metal material of the attachment base during processing. However, in the configuration of the embodiment, the horn switch mechanism 60 can be conveniently arranged below the airbag device 20.

Particularly, in a case of the embodiment, the upper stem portion 32 which is raised upward from the plate main body 31 of a substantially annular shape and abuts on the nut 43 fastened to the bolt 42*b* and the lower step portion 34 which is recessed downward and to which the switch main body 62 is attached are provided and the amount of the step of each of the upper step portion 32 and the lower step portion 34 with respect to the plate main body 31 is reduced. Therefore, the attachment seat 35 to which the switch main body 62 is attached is disposed on the shallow-drawing-processed lower step portion 34, that is, the shallow-drawing-processed lower step portion 34 where the switch main body 62 is exposed from a lateral side. As a result, the attachment seat 35 can be conveniently formed.

In the embodiment, the horn switch body 61 having the attachment pin 71 is exemplified as a fastening member for mounting the airbag device 20 on the steering wheel main body 1. However, when the horn switch mechanism is configured as a button type and configured to be disposed on, for example, the spoke portion S, the horn switch body 61 of the horn switch mechanism 60 may not be used as the fastening member and the attachment pin 71, for example, may be used as the fastening member by fixing the attachment pin 71 capable of being fastened to the fastening portion 10 to the attachment base 21 without the support plate 30. Even in this case, when at least a part (a part of the head portion 71*a*) of the attachment pin 71 is disposed so as to vertically overlap the flange portion 40*c* of the inflator 40, compactification of the airbag device 20 can be achieved.

Further, in a case where a part of the fastening member is stacked in the up-down direction below the flange portion 40*c*, the fastening member is disposed as close to the flange portion 40*c* as possible, in such a manner that it is preferable to make the vertical dimension of the airbag device 20 compact.

What is claimed is:

1. An airbag device for a steering wheel comprising:
   an inflator for supplying an inflation gas to a folded airbag
      the inflator including:
      a main body having a gas discharge port on an upper portion side; and
      a flange portion provided on an outer peripheral surface of the main body which is the outer peripheral surface located further on a lower side than the gas discharge port;
   an attachment base having an attachment plate which is attached to the flange portion to hold the inflator;
   fastening members arranged at a plurality of positions in a lower surface side around the inflator and configured to mount the inflator on the steering wheel main body, and each of the fastening members being disposed such that at least a part of the fastening member vertically overlaps the flange portion in a lower side of the flange portion;
   a support plate disposed below the attachment plate;
   horn switch bodies disposed between the attachment plate and the support plate;
   the horn switch bodies arranged at a plurality of positions around the inflator and each include:
      a switch a gain body which is interposed between the attachment plate and the support plate and has an upper side contact point and a lower side contact point which can operate a horn by being brought into contact with each other;
      an attachment pin in which the lower side contact point is disposed on an upper surface side and which is prevented from coming off from the switch main body, extends downward from the switch main body through the support plate, and is fastened to a fastening portion of the steering wheel main body; and an urging unit which urges the upper side contact point so as to be separated from the lower side contact point by a horn operating stroke; and each of the horn switch bodies constitutes one of the fastening members and is disposed such that at least a part of the switch main body vertically overlaps the flange portion on a lower side of the flange portion.

* * * * *